United States Patent [19]

Du Bois

[11] 4,154,453
[45] May 15, 1979

[54] FIFTH WHEEL TRUSS ASSEMBLY

[76] Inventor: Robert K. Du Bois, 2900 Madison Ave., Fullerton, Calif. 92631

[21] Appl. No.: 867,849

[22] Filed: Jan. 9, 1978

[51] Int. Cl.² .............................................. B62D 53/08
[52] U.S. Cl. .............................. 280/423 R; 280/43.23; 280/439
[58] Field of Search ........... 280/433, 439, 440, 405 R, 280/415 B, 423 B, 425 A, 423 R, 43.23; 214/390

[56] References Cited

U.S. PATENT DOCUMENTS

| 2,821,409 | 1/1958 | Chalmers | 280/439 X |
| 3,151,880 | 10/1964 | Black | 280/415 B |
| 3,645,559 | 2/1972 | Stafford | 280/423 B |
| 4,047,733 | 9/1977 | Parkes | 280/423 B |

FOREIGN PATENT DOCUMENTS 454637  6/1978  Switzerland .............................. 280/439

Primary Examiner—John A. Pekar
Attorney, Agent, or Firm—Nathan Edelberg; Sheldon Kanars; Bernard Franz

[57] ABSTRACT

A truss assembly having one end detachably connected to the fifth wheel of a tractor, the opposite end of the truss being detachably connected to one end of a cargo to be transported, the opposite end of the cargo being detachably connected to a dolly, the dolly and truss assembly being connectable when the transported load has been removed therefrom.

4 Claims, 7 Drawing Figures

FIFTH WHEEL TRUSS ASSEMBLY

The invention described herein may be manufactured and used by or for the Government for governmental purposes without the payment of any royalties thereon or therefor.

BACKGROUND OF THE INVENTION

Heretofore, heavy cargo has been transported on a flat bed vehicle, such as a trailer, which could be connected to a truck for transportation of the cargo. Because of the size and weight limitations imposed on the cargo by conventional tractor-trailer arrangements, the fifth wheel truss assembly of the present invention has been devised which comprises, essentially, a fifth wheel truss assembly having a king pin adapted to be connected to the fifth wheel of a conventional tractor. The truss assembly is also connectable to one end of a cargo to be transported, and a two-wheeled dolly is connectable to the opposite end of the cargo. By this construction and arrangement, longer and heavier loads can be transported than heretofore, since the cargo, being transported, becomes an integral part of the trailer. After the cargo has reached its destination, the fifth wheel truss assembly and two-wheeled dolly are disconnected therefrom, and connected to each other for transportation by the truck.

DESCRIPTION OF THE PREFERRED EMBODIMENT

Figure 1:
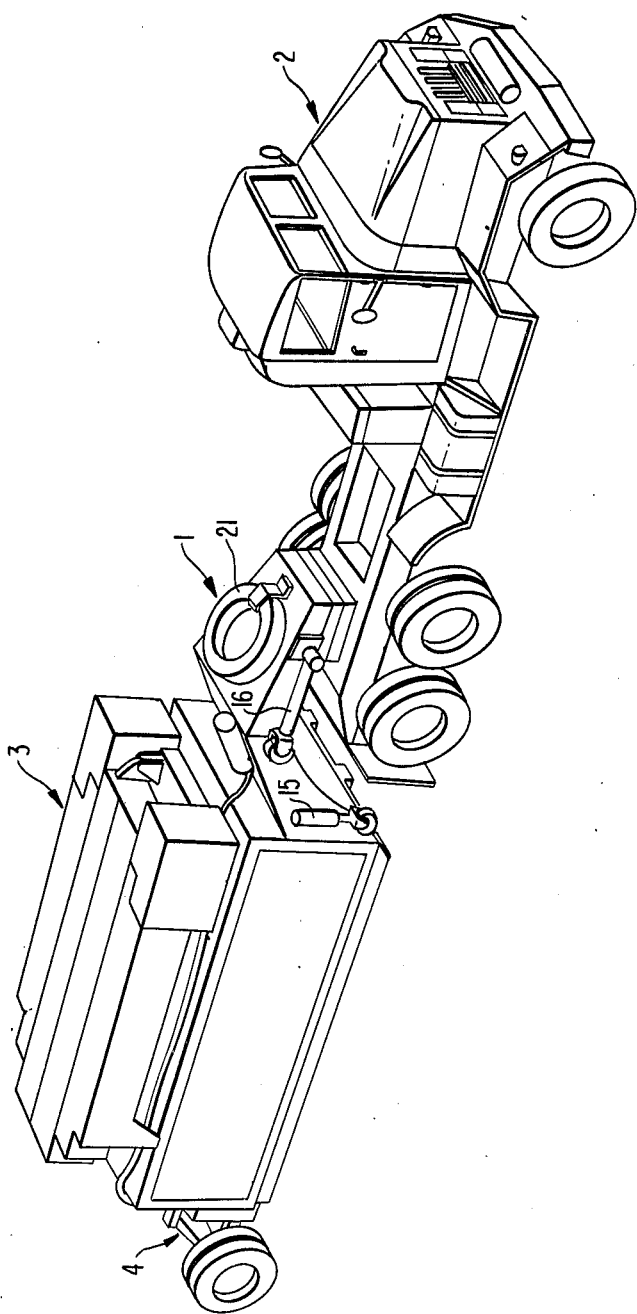
FIG. 1 is a perspective view of the fifth wheel truss assembly of the present invention operatively connected between a tractor and a cargo being transported.

Referring to the drawings and more particularly to FIG. 1 thereof, the fifth wheel truss assembly 1 is shown in the operative position connected between a truck 2 and one end of a cargo 3 being transported, a two-wheeled dolly 4 being connected to the opposite end of the cargo.

Figure 2:
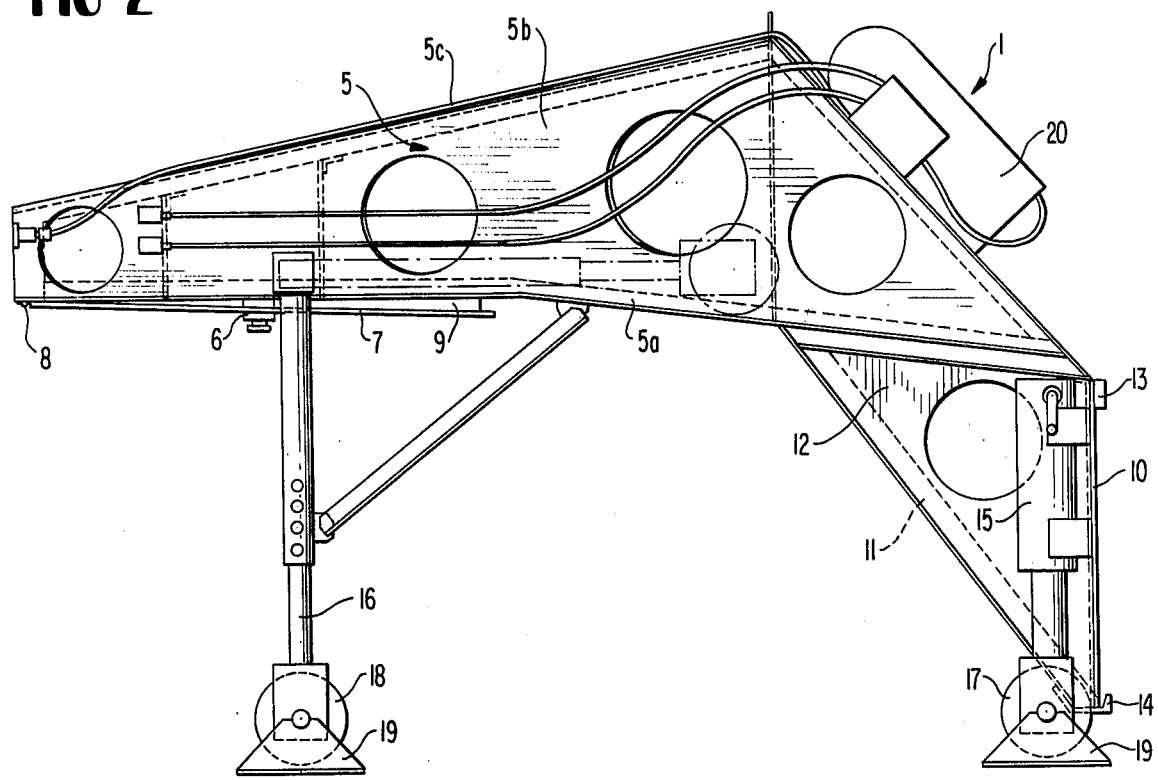
FIG. 2 is a side elevational view of the fifth wheel truss assembly of the present invention with the truck and cargo detached therefrom.
Figure 3:
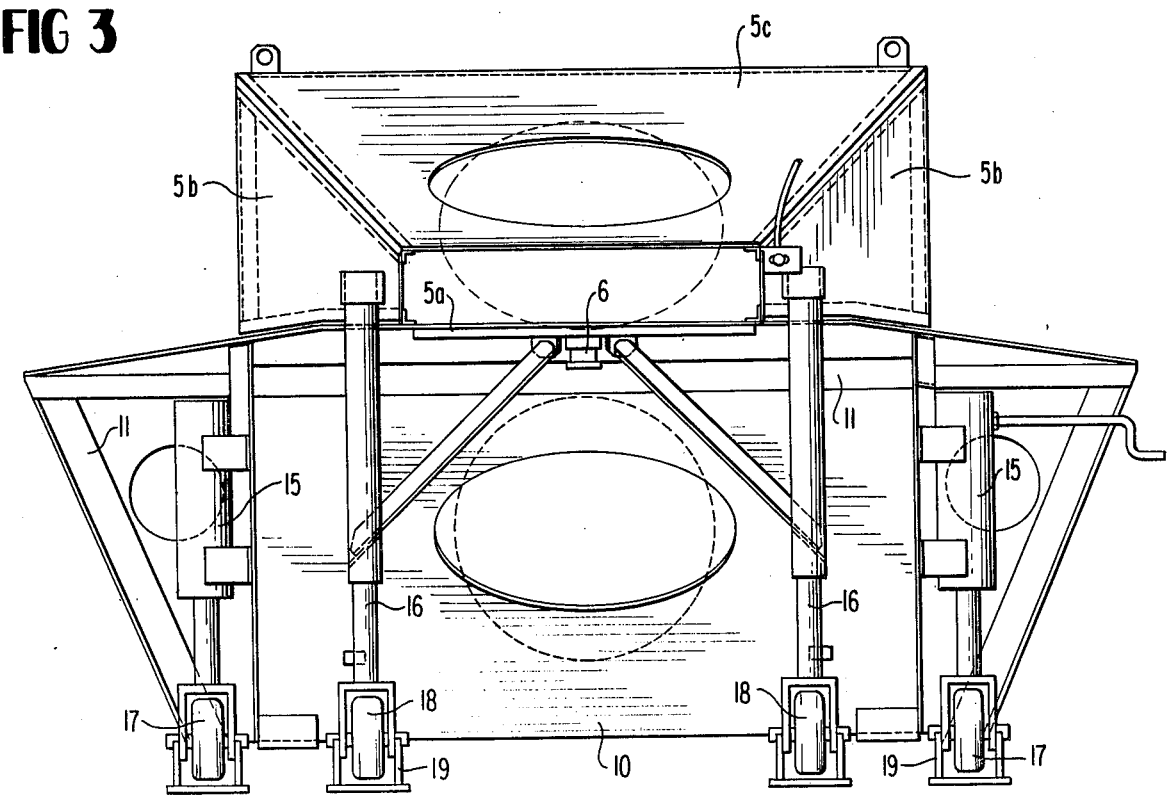
FIGS. 3 is a front elevational view of the fifth wheel truss assembly as shown in FIG. 2.

The details of construction of the fifth wheel truss assembly are shown in FIGS. 2 and 3 wherein it will be seen that the truss assembly includes a housing 5 having a bottom wall 5a, side walls 5b, and a top wall 5c. A king pin 6 is connected to the lower surface of the bottom wall 5a and depends therefrom, the king pin being connectable to the fifth wheel of the truck, to be described more fully hereinafter. A plate 7 is pivotally connected to the bottom wall 5c of the housing as at 8, and a pneumatic spring 9 is mounted between the lower surface of the bottom wall 5c and the upper surface of the plate 7, to thereby provide an air spring suspension for the truss assembly when connected to the truck fifth wheel. The bottom wall 5a of the housing also has a depending plate 10 secured thereto and rigidly connected to the housing by angle irons 11 and gusset plates 12. The upper and bottom edges of the depending plate 10 are provided with suitable connectors 13 and 14 to which one end of the cargo is adapted to be connected.

To support the truss assembly on the ground when detached from the tractor, a pair of jacks 15 are secured to one end of the housing 5, in proximity to the cargo connection plate 10, and a pair of extensible legs 16 are pivotally connected to the housing 5 in proximity to the king pin 6. The lower ends of the jacks and legs are provided with wheels 17 and 18 which are adapted to be seated in pads or chocks 19 supported on the ground.

To complete the description of the construction of the fifth wheel assembly, a portion of the top of the housing is adapted to support a compressed air cylinder 20 forming a reservoir for the air brakes of the dolly 4, and another portion of the top of the housing is adapted to support a spare tire 21 (FIG. 1) for use on either the truck 2 or dolly 4. The various apertures or holes in the plates used to construct the fifth wheel truss assembly, as shown in FIGS. 2 and 3, are formed therein to reduce the overall weight of the truss assembly while maintaining its strength and rigidity.

Figure 4:
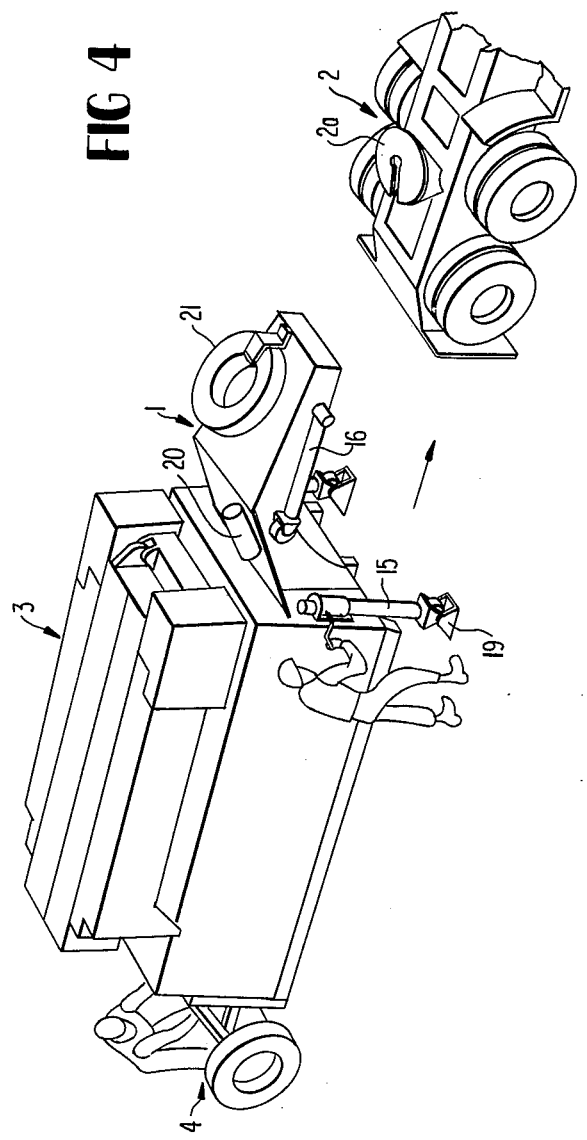
FIG. 4, 5, 6 and 7 are perspective views showing the steps of disconnecting the truck from the cargo and associated fifth wheel truss assembly and two-wheeled dolly, disconnecting the cargo from the fifth wheel truss assembly and dolly, and connecting the dolly and fifth wheel truss assembly together for subsequent connection to the truck.
Figure 5:
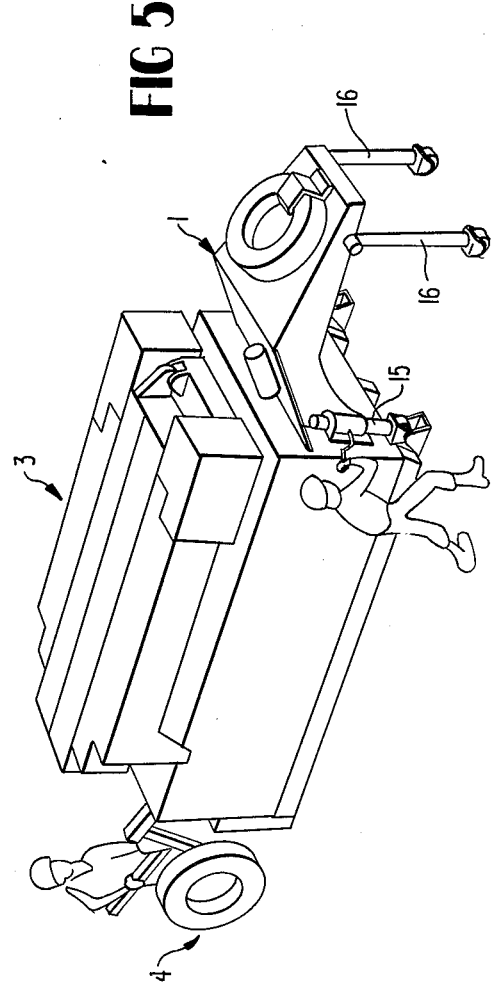
Figure 6:
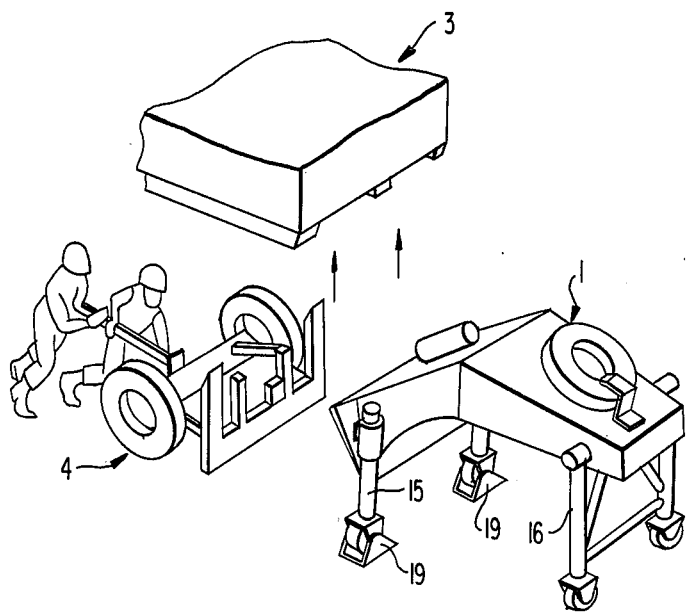
Figure 7:
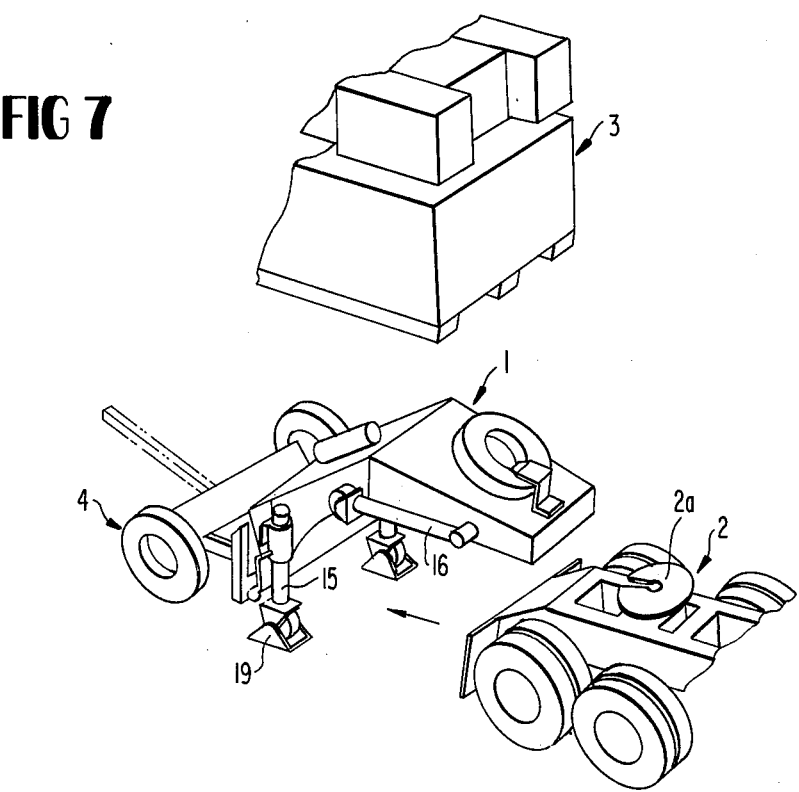

In the use of the fifth wheel truss assembly, as will be seen in FIGS. 1 and 4 to 7, the cargo 3 is transported to the job site with the truss assembly 1 connected to the fifth wheel of the tractor 2 and one end of the cargo 3, with the dolly 4 connected to the opposite end of the cargo, as shown in FIG. 1. Upon reaching the destination or job site, as shown in FIG. 4, the jacks 15 are lowered to support the cargo, and the tractor fifth wheel 2a is disconnected from the truss assembly. The extensible legs 16 are then lowered, as shown in FIG. 5, and the jacks 15 are raised while the dolly 4 is disconnected from the cargo thus lowering the cargo until it is supported on the ground. With the cargo 3 disconnected from the truss assembly 2 and the dolly 4, as will be seen in FIG. 6, the dolly 4 is moved into position to be connected to the end of the truss assembly which had been previously connected to the cargo. The same connectors 13 and 14 employed for connecting the cargo to the truss assembly may also be used for connecting the dolly thereto. As will be seen in FIG. 7, the dolly 4 is connected to the truss assembly 2, legs 16 are folded to the stored position and the tractor is backed into the truss assembly until the king pin 6 on the truss interlocks with the fifth wheel 2a on the tractor, whereby the truss and dolly may be transported as a unit.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A fifth wheel truss assembly for use with a dolly adapted to be detachably connected to opposite ends of a cargo unit, and the fifth wheel truss assembly being adapted to be detachably connected to a tractor for transporting the cargo unit;

wherein said fifth wheel truss assembly comprises a housing having top, bottom and side walls, a king pin secured to the bottom wall and depending therefrom, said king pin being connectable to the fifth wheel of a tractor, a depending plate secured to the bottom wall of said housing, the depending plate having a vertical surface with connectors at the upper and bottom edges for connection to one vertical end wall of said cargo unit, the truss assembly being constructed to reduce its overall weight while maintaining its strength and rigidity;

wherein said dolly has an axle with a pair of transport wheels, a vertical plate with connectors at the upper and bottom edges for connection to the opposite vertical end wall of said cargo unit, and a handle for manual movement of the dolly;

wherein said fifth wheel truss assembly further includes a pair of jacks at the end adjacent said depending plate, and a pair of extensible legs pivotally connected to the housing in proximity to the king pin, each of the jacks and the legs having a small wheel, the extensible legs having a stored position pivoted upward toward the rear and secured to the housing, the jacks being adapted to be normally raised during transport, to be lowered to support the cargo unit with the tractor detached, and to be raised to lower the cargo unit to the ground so that the truss assembly may be detached from the cargo unit, the extensible legs being adapted to be pivoted to the vertical position, so that with the truss assembly detached from both the tractor and the cargo unit it is supported on the jacks and the extensible legs and may be manually moved on said small wheels;

wherein the dolly is connectable to the fifth wheel truss assembly when each has been detached from the cargo unit, with said depending plate and said vertical plate connected together using said connectors, and the extensible legs pivoted to said stored position so that the combined truss assembly and dolly is supported only by said jacks and by said pair of transport wheels, ready to be attached to the fifth wheel of a tractor.

2. The apparatus according to claim 1, wherein a plate is pivotally connected to the bottom wall of the housing, and a pneumatic spring is mounted between the bottom wall and said pivotal plate to thereby provide an air spring suspension for the truss assembly when connected to the tractor.

3. The apparatus according to claim 1, wherein said depending plate is secured to said housing by bracing members and gusset plates on the sides, and wherein the various walls and plates of the truss assembly have apertures therein to contribute to said reduction of the overall weight of the truss assembly while maintaining its strength and rigidity.

4. The apparatus according to claim 3, wherein said gusset plates are triangular with apertures therein, wherein the top wall of the truss assembly comprises a front surface and a rear surface both sloping upward to a line of intersection between them, said line of intersection being substantially closer to the depending plate end than to the king pin, with said rear surface extending to the bottom wall and to the depending plate, further comprising a small forward wall between said front surface and the bottom wall, the forward wall being substantially narrower between the side walls than the width at said line of intersection, and wherein the pivot connections of the extensible legs are to the side walls slightly rearward of the king pin.

* * * * *